G. H. BLETTNER.
METHOD OF MAKING PISTON RINGS.
APPLICATION FILED JULY 17, 1916.
1,223,930.
Patented Apr. 24, 1917.
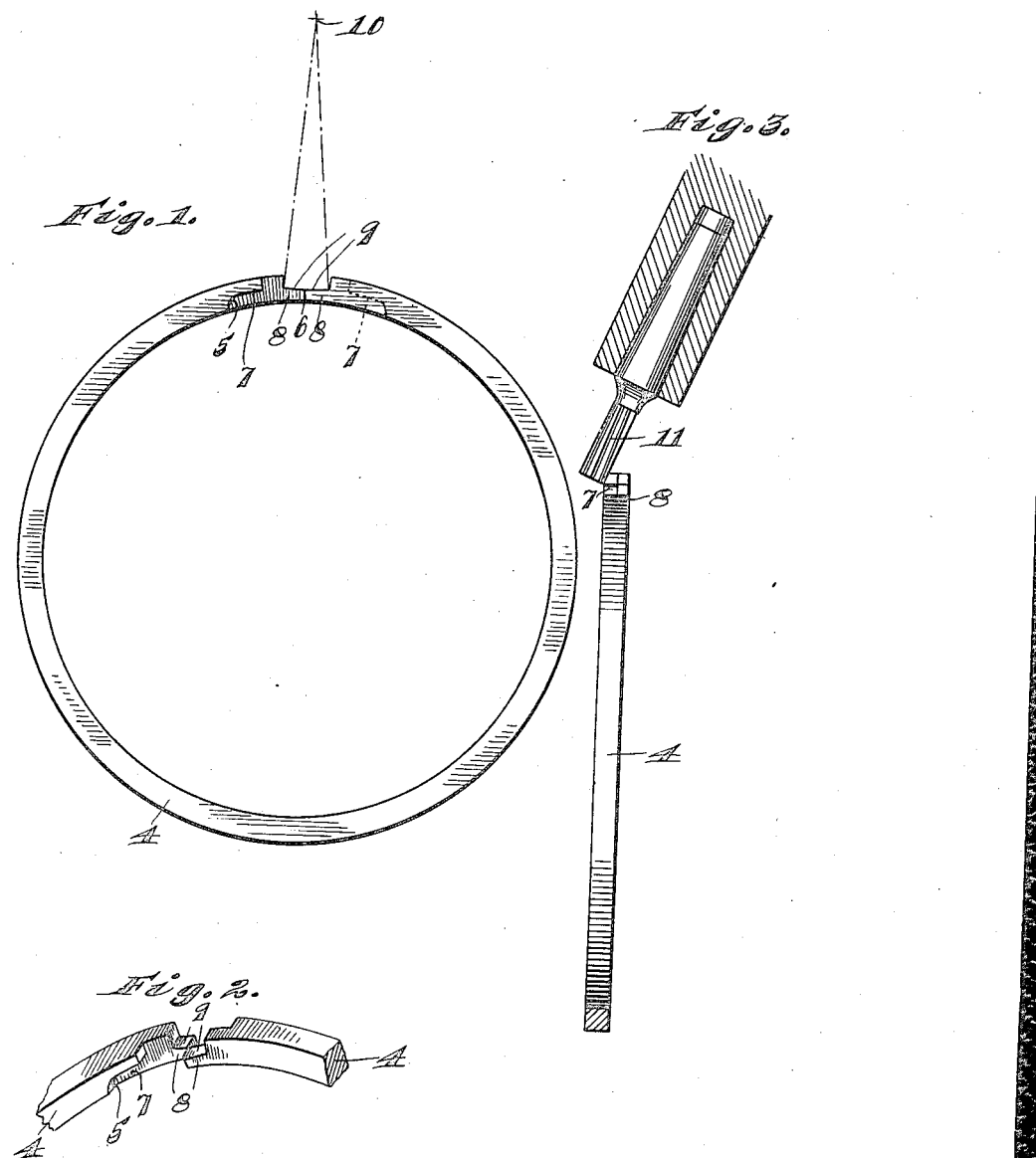
Witnesses:
C. E. Wessels
B. G. Richards
Inventor:
George H. Blettner,
By Joshua R. H. Potts
his Attorney.

UNITED STATES PATENT OFFICE.

GEORGE H. BLETTNER, OF CHICAGO, ILLINOIS.

METHOD OF MAKING PISTON-RINGS.

1,223,930.

Specification of Letters Patent. Patented Apr. 24, 1917.

Application filed July 17, 1916. Serial No. 109,681.

*To all whom it may concern:*

Be it known that I, GEORGE H. BLETTNER, a citizen of the United States, and a resident of the city of Chicago, county of Cook, and State of Illinois, have invented certain new and useful Improvements in Methods of Making Piston-Rings, of which the following is a specification.

My invention relates to improvements in methods of making piston rings, and has for its object the provision of an improved method for forming split piston rings to produce a tight seal at the split therein.

The invention consists in the method of procedure hereinafter described and claimed.

The invention will be best understood by reference to the accompanying drawing forming a part of this specification, and in which, Figure 1 is a side view of a piston ring embodying my invention, Fig. 2—a perspective view of the gap or split portion of said ring, and Fig. 3—a view illustrating the method of dressing the outer surfaces of tongues employed in the ring construction.

The preferred form of construction, as illustrated in the drawing, and the method of procedure, comprises an ordinary split piston ring 4 having oppositely arranged notches 5 in the inner side thereof on opposite sides of the split 6 therein. The outer surfaces 7 of each of the notches 5 is dressed to the curvature of the ring, that is, is dressed to a cylindrical surface with the center of the ring as an axis. The ring is also provided with the usual tongues 8 correspondingly arranged to fit within the notches 5 when the parts of the ring are sprung together in the usual manner. The outer surfaces 9 of the tongues 8 are beveled from their bases inwardly toward their free ends so that when sprung into the recesses 5, said surfaces will nicely fit and conform to the surfaces 7. I have learned by experiment and experience that when a piston ring such as is illustrated is sprung to fit within a cylinder it does not bend or spring all at one point but at various points having the effect of tilting the free ends of the tongues 8 outwardly, so that it is necessary to give the tongues a slight inward bevel from their bases toward their free ends, and I have also discovered by experiment that the best bevel to impart is on a curvature having a radius substantially equal to the radius of the piston ring, or in other words, in the form illustrated in Fig. 1, the surfaces 9 are dressed to the curvature of a circle having the point 10 as a center.

I effect the dressing of the surfaces 9 to the proper curvature and bevel by means of an end milling tool 11 arranged at an angle to the surface of the piston ring, as indicated in Fig. 3 and then subjecting said surfaces to the action of said tool either by passing the tool thereover or the ring across the end of the tool. By tilting the tool to different angles, different degrees of curvature may be obtained, but as stated before, I have found by experiment that the best results are obtained by imparting a curvature substantially equal to that of the ring itself, so that small rings will have a comparatively sharp curvature at these points and larger rings comparatively less curvature. The ring thus produced will have a very tight and close fit between the outer surfaces of the tongues and the outer surfaces of their receiving notches, thus tending to prevent leakage which, of course, is highly desirable.

Having described my invention what I claim as new and desire to secure by Letters Patent is:

The method of dressing tongues of split piston rings which consists in arranging an end milling tool at an inclination thereto and subjecting the outer surfaces of said tongues to the action thereof, substantially as described.

In testimony whereof I have signed my name to this specification in the presence of two subscribing witnesses.

GEORGE H. BLETTNER.

Witnesses:
JOSHUA R. H. POTTS,
CORA F. SCHIEBER.